US012680526B2

(12) United States Patent
Carmody, III

(10) Patent No.: US 12,680,526 B2
(45) Date of Patent: Jul. 14, 2026

(54) SUSTAINABLE ENERGY AND AGRICULTURAL SYSTEMS

(71) Applicant: Richard A. Carmody, III, Ringgold, GA (US)

(72) Inventor: Richard A. Carmody, III, Ringgold, GA (US)

(*) Notice: Subject to any disclaimer, the term of this patent is extended or adjusted under 35 U.S.C. 154(b) by 0 days.

(21) Appl. No.: 18/754,482

(22) Filed: Jun. 26, 2024

(65) Prior Publication Data

US 2024/0426269 A1 Dec. 26, 2024

Related U.S. Application Data

(60) Provisional application No. 63/523,262, filed on Jun. 26, 2023.

(51) Int. Cl.
*F03B 13/00* (2006.01)
*F03B 13/18* (2006.01)
*F03B 13/24* (2006.01)

(52) U.S. Cl.
CPC .......... *F03B 13/1835* (2013.01); *F03B 13/24* (2013.01); *F05B 2220/705* (2020.08); *F05B 2220/708* (2013.01)

(58) Field of Classification Search
CPC .................. F03B 13/1835; F03B 13/24; F05B 2220/705; F05B 2220/708; Y02E 10/30
See application file for complete search history.

(56) References Cited

U.S. PATENT DOCUMENTS 4,492,875 A * 1/1985 Rowe ...................... F03B 13/20 310/273
6,870,280 B2 * 3/2005 Pechler ................. F03D 3/0427 290/55
2013/0140823 A1 * 6/2013 Henry ....................... F03B 3/04 290/53
2015/0260150 A1 * 9/2015 Sullivan ................. H02K 35/02 290/53
2023/0323850 A1 * 10/2023 Sidenmark .......... F03B 13/1885 290/53

FOREIGN PATENT DOCUMENTS

GB 2463129 A * 3/2010 ............ H02K 35/02

* cited by examiner

*Primary Examiner* — Julio C. Gonzalez
(74) *Attorney, Agent, or Firm* — Miller & Martin PLLC

(57) ABSTRACT

Renewable energy systems can be deployed on water or with agricultural systems including solar energy panels and wind turbines of various types. Vertically oriented wind turbines may be combined with systems to maintain them vertical, air directors which may also have venturi effect turbines, or not. Wave energy may be captured from roll or pitch energy capture devices or even piston operated anchored systems for various embodiments. Agricultural facilities may combine various technologies to dramatically increase crop yield.

14 Claims, 14 Drawing Sheets

SUSTAINABLE ENERGY AND AGRICULTURAL SYSTEMS

CLAIM OF PRIORITY

This application claims the benefit of U.S. Provisional Application No. 63/523,262 filed Jun. 26, 2023, which is incorporated herein by reference herein in its entirety.

FIELD OF THE INVENTION

The present invention relates to a platform configured, preferably, to generate energy in multiple manners, and more preferably, for at least some embodiments, for a waterborne energy platform designed to harness wind energy through at least one wind turbine, if not a plurality thereof, and/or at least one, if not multiple wave energy capturing devices, and/or solar energy panels, along with the possibility of use at least some of these features with a ship or an agricultural facility calculated to dramatically increase productivity with other possible improvements.

BACKGROUND OF THE INVENTION

Various land based solar panel systems and wind turbines are widely available in the marketplace. Less common in the marketplace are wave energy capturing devices. Combinations of multiple types of theses systems on a waterborne platform whether anchored to a seabed or mobile are not believed to exist in the marketplace.

Additionally, traditional farming techniques permit an acre of farmland to provide a yield sufficient to feed approximately 15 people for a year. With populations increasing, there is believed to be a need to dramatically increase yield for at least some applications. There is also believed a need to repurpose urban buildings for productive uses in at least some cities.

SUMMARY OF THE INVENTION

It is an object of at least some embodiments of the present invention to provide a platform for capturing at least two different forms of energy selected from the group of wind, solar and wave.

It is an object of at least some embodiments to provide a platform to employ at least two different types of wind energy generation and/or wave energy generation systems on a single installation.

It is an object of at least some embodiments to provide an anchored floating platform possibly having solar panels extending beyond a perimeter of a float, possibly combined with angled solar panels so as to increase the exposed surface area at least 150 percent if not twice as much as flat panels just covering the perimeter of the float.

It is another object of at least some embodiments of the present invention to provide a platform, whether land based on waterborne, having a plurality of wind turbines which have air directors to assist in increasing the efficiency of at least one of the wind turbines in operation.

It is another object of many embodiments of the present invention to provide a deck or platform having a circumference or perimeter with directors spaced apart along the circumference or perimeter directing wind toward internal wind turbines. For at least some embodiments, these air foils may have openings facilitating a venturi effect to pull air therefrom with air pulled up and/or through the air foils to drive internal generator(s) or flywheels from the air flow.

It is another object of at least some embodiments of the present invention to provide a waterborne platform with an internally and/or centrally supported wind turbine maintained in a vertical orientation.

It is yet another object of at least some embodiments to provide an anchoring system for a waterborne platform advantageously extracting energy from vertical motion of at least portions of the platform due to wave action acting on the buoyancy of the platform.

It is another object of at least some embodiments to provide wave energy converters toward the circumference of a waterborne platform to create energy as the platform oscillates due to wave action, whether the waterborne platform be anchored or mobile, like a ship.

It is another object of at least some embodiments to capture wave energy from a stabilizer of a central wind turbine.

It is another object of many embodiments to combine multiple energy capture devices relying on different energy sources.

It is an object of at least some embodiments to provide energy capture devices, possibly similar to those used on the anchored waterborne systems, on ships in an effort to generate electricity from at least one of pitch and/or roll of the ship.

It is an object of many embodiments to provide an indoor agricultural facility having at least some features selected from hydroponically grown food on multiple levels per floor (such as ten levels per 14 foot floor), providing sliding carriages so they can be adjacent to one another, but moved to provide an aisle, LED lighting to reduce power consumption and heat output, variable spectrum lighting to increase yield and our efficiency, carbon dioxide input such as from carbon dioxide capture units on an external portion of the structure, such as on a roof. Adding additional floors increases the yield per square unit of land occupied by the structure, and permits re-purposing of buildings, particularly in urban environments, or other locations.

Some indoor agriculture facilities may use various energy sources as described herein, possibly including solar panels which could possibly extend beyond a perimeter of the building to provide increased capture area, rainwater capture area and/or shade.

Still other embodiments contemplate carbon negative urban agricultural facilities.

Accordingly, in accordance with presently preferred embodiments of the present invention an energy platform may be provided, such as an over-the-horizon energy platform. Directed upwardly relative to the platform may be one or more solar panels. For at least some preferred embodiments, a grid of joist girders forms a platform above a perimeter of first wind turbines. The joist girders may support cantilevered or otherwise supported solar arrays, possibly beyond a perimeter of a float supporting the energy platform on a surface of water, such as, but not limited to an ocean. The solar array may have panels angled relative to a vertical (and/or a horizontal) to obtain better efficiency of sun exposure rather than lying flat. Other solar arrays may have at least some panels extending parallel or flat relative to the platform.

A plurality of first wind turbines are preferably radially inwardly located relative to a circumference of the platform. These first turbines are located towards an outer perimeter of the platform, but preferably are radially inwardly directed relative to arrow-shaped directors or segments which may be air foils. The air foils may assist in funneling accelerated air to the first, possibly vertically oriented, first wind turbines positioned around the platform, which may at least partially be supported by a ring torus float. For at least some embodiments, as air passes through or along the air foil(s), air may be drawn from the ring torus from below through orifices in the side surfaces of the directors. Inside the ring torus, or within the air foils, there may be second wind turbines or flywheels that generate energy as air passes up through the air foil(s) from an inlet not along the side surfaces of the directors, such as at a rear of the director (closer to the first wind generators, or from below.

A first piston may be positioned on the cable between the ocean floor and the platform, such as the center of the platform. Second pistons may be attached to cables connected toward the platform perimeter, particularly if the cables connected to the platform perimeter connect together along an anchor line before proceeding toward the ocean floor. Energy may be captured as the platform surges up and down acting on the first piston and/or second pistons. If the platform oscillates or tilts, the second pistons may capture energy. These are first wave energy generator(s).

A series of tracks, such as copper tracks, may be positioned along, at or beneath the torus or other buoyancy support for the platform. Some embodiments may have the cylinders coordinate with the location of the perimeter or first turbines. Within the cylinders may be magnets, such as super magnets, that may assist in capturing energy as the platform oscillates and possibly also counterbalance the platform. These devices are second wave energy generator (s).

A large ball is shown in the center (but could be a series of balls, possibly off center), which has a third wind turbine attached thereto. The ball rides in a cradle supported by bearings, aka a bearing ring, to permit the platform to rotate while maintain the third wind turbine vertically oriented, for at least some embodiments. Software may be useful for some embodiments with motors to maintain a desired vertical orientation of the third wind turbine(s). A stability system may include at least one magnetic rolling ball which is directed about a bottom of the ball so as to potentially capture electrical energy from the relative motion thereof as an energy capture device. The magnetic rolling ball(s) may be restrained along segments with coils to capture the energy, or otherwise capture energy as is known in the art. This is a third wave energy generator system.

If all of the energy capture improvements are included in a single platform, there could be up to at least three forms of capture for wind energy, up to or at least two to three forms of capture for wave energy, and potentially up to twice or more the capacity of solar production per square foot of floating perimeter area.

It is contemplated that wave energy generators, some likely configured similarly to the second wave generators may capture electrical energy from the roll and/or pitch of ships to assist, if not provide most of the electrical needs of a ship. Solar panels, possibly retracting panels to provide access to storage below, may be utilized on ships as well. Sails having solar panels and/or other solar panel locations may be beneficial for at least some embodiments as well.

Some of these energy capture sources may be used with an indoor agriculture facility which is also envisioned as having improvements over the prior art. The indoor facility may employ hydroponic growing to increase yield by a factor of up to 20%. Instead of spacing rows apart, some embodiments envision adjacent rows with sliding stacks somewhat like sliding file cabinets which may have a single vacant row and sliding plant rows whereby the plant rows may be slid to accommodate the vacant row or gap at a desired position amongst the plant rows to permit planting, fertilizing, picking, etc. Such a construction almost doubles the yield of traditional hydroponic facilities. LCD lighting, and more particularly LCD variable spectrum lighting may be used to reduce heat while also increasing the efficiency for yield, which can increase yield by up to another 10% in some studies. Stacking of plants on plant stacks up to 10 high, or more, may increase the yield up to another factor of 10×. Having multiple grow floors also increases yield per acre based on the number of floor space utilized.

Carbon dioxide capture from outside and either stored for sale such as for carbonated beverage or other use, or also provided to the plants in the facility may increase yield up to another 20%.

For many indoor agriculture facilities, the wind turbine improvements and solar improvements described above may be provided on site, if not on a roof-top. Solar panels may cantileveredly extend beyond the footprint of the building to provide electrical energy generation as well as shade, snow protection and/or water collection. Water collected from the roof and/or solar panels, such as from rain, etc. may be directed to use in growing plants. External dehumidifiers may be used to collect water, if necessary for plants as well.

Any or all of the various improvements described above may be combined into at least one of a water-borne energy platform which could provide power to a location remote from the platform in many embodiments, or an indoor agriculture station which could prove to have yields up to two magnitudes greater than traditional farming techniques on land (i.e., yields up to 1500 people fed per land acre as compared to 15 people per acre). Not only may facilities be built from scratch, existing buildings, particularly those in urban areas, might be converted so as to provide energy sources for the cities (or other areas) as well as a source of food for the local, or other populations.

Still other embodiments such as ships or other vehicles may employ the first and second wave energy generators such as to capture energy from the pitch or roll of a ship or other waterborne vessel to at least assist in providing the electrical energy needs of the ship.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENTS

Figure 1:
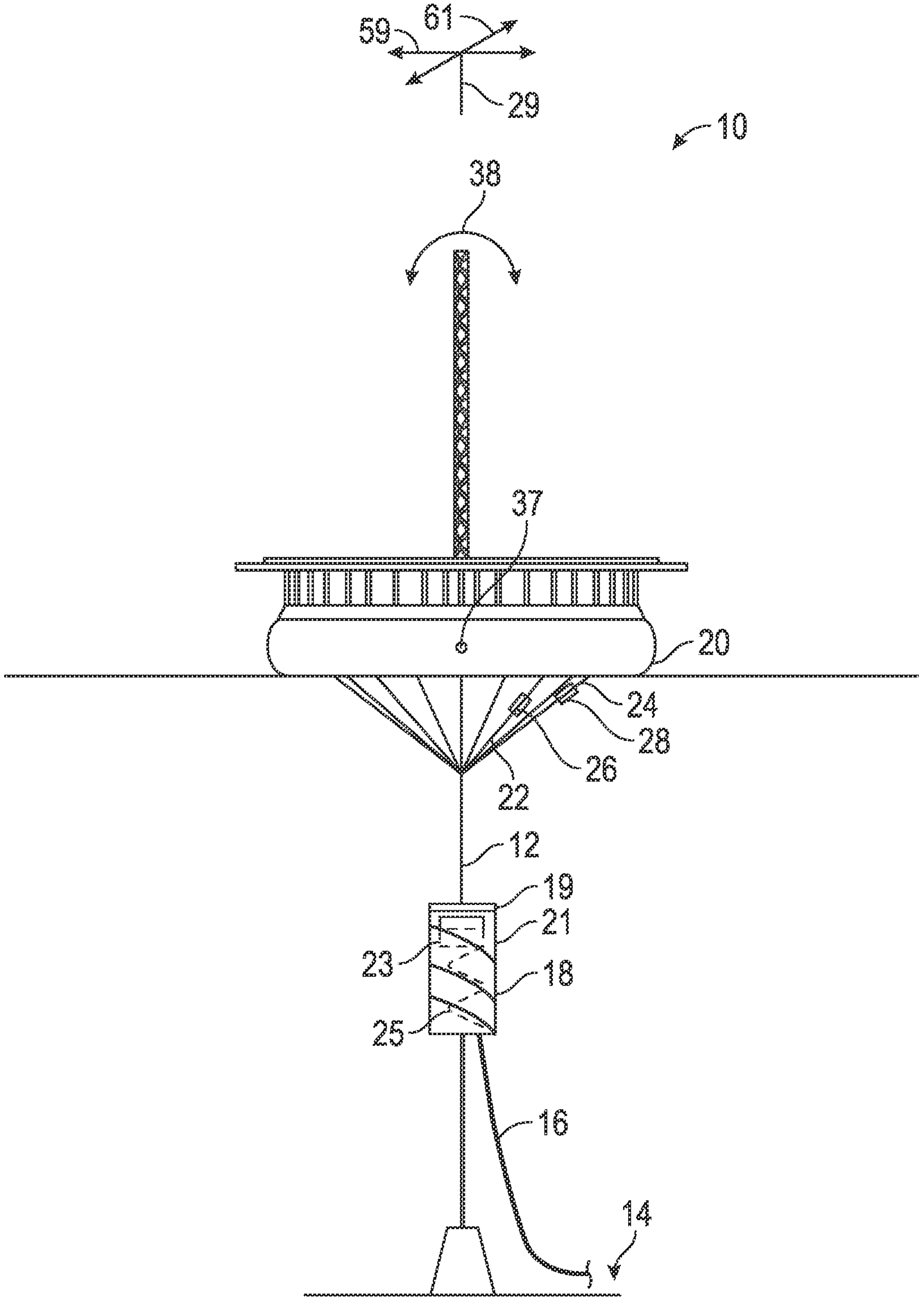
FIG. 1 is a side plan view of a presently preferred embodiment of an anchored waterborne energy generation system.
Figure 2:
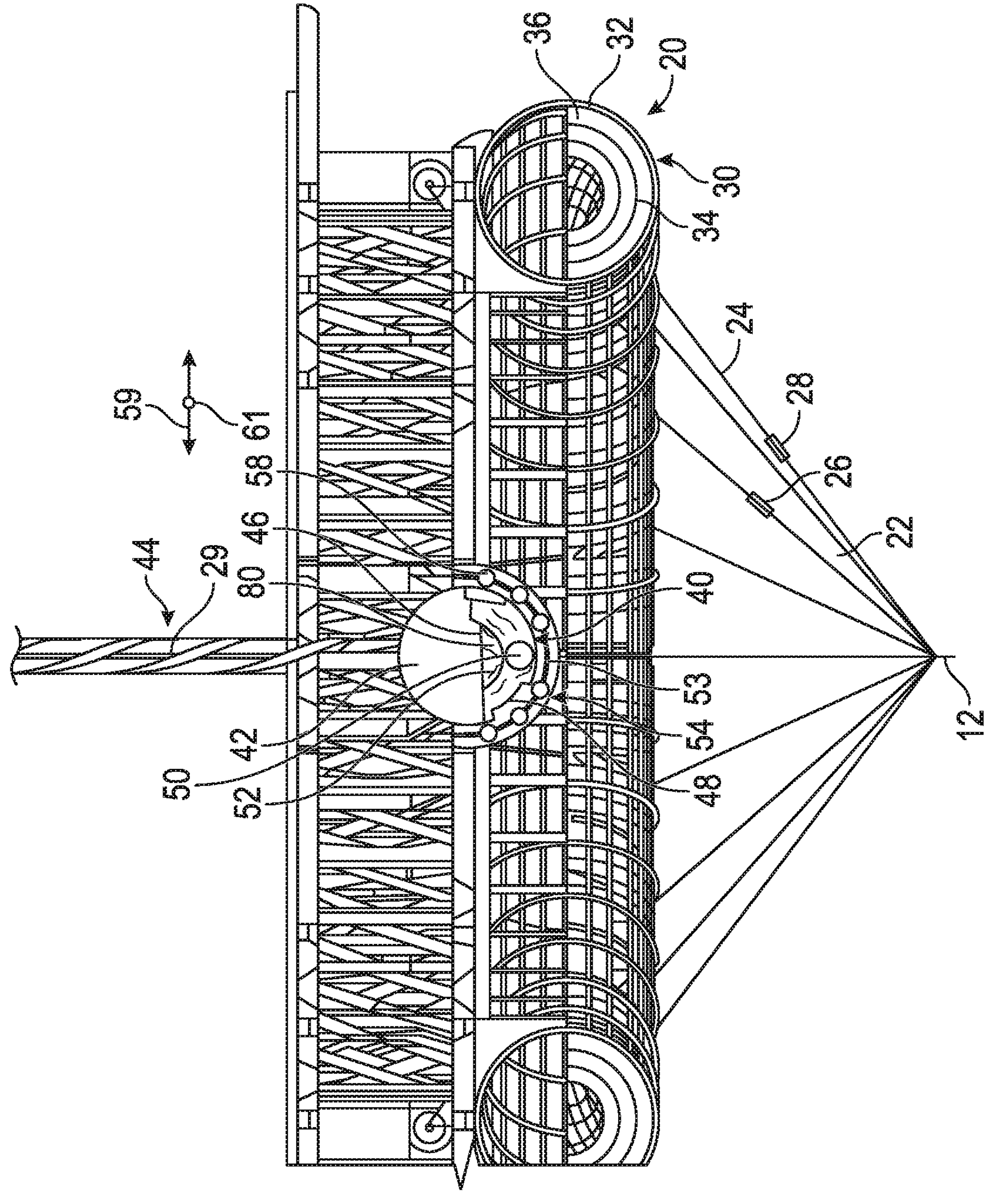
FIG. 2 is a cross sectional view of the embodiment of FIG. 1.

FIG. 1 shows a waterborne energy platform 10 as would be anchored by anchor line 12 to the bottom 14 of an ocean, lake or other water source. A first energy generator 18 is shown along a portion of the anchor line 12 intermediate a float 20 and the bottom 14. A plurality of first energy generators 26,28, etc., could be located along spokes 22,24, etc. in this or other embodiments as well or even in place of first energy generator 18.

First wave energy generator 18 generates electricity with the up and down motion of the float 20 relative to the bottom, likely similarly to a “shake light” whereby a magnet is moved relative to a coil in linear reciprocation. Such electrical energy may be transmitted through cable 16 to a remote location such as an offshore platform, or back to an inland location.

First wave energy generator 18 may have a piston 19 moving relative to a case 21 which may act like a track. Piston 19 may have a magnet 23 connected thereto. A spring 25 may attempt to pull the magnet back to a specific location. As a wave pushes or pulls the float 20 upward the anchor line 12 pulls the piston 19 relative to the case 21 against the spring to move the magnet 23 relative to a coil 27, if utilized, to generate electricity. Other constructions may be employed as a first wave energy generator 18 in other embodiments. It is believed that track or case 21 could be copper or other material and that coil 27 may not necessarily be required for all embodiments. Coil 27 is windings of wire as are well known in the art. All embodiments may not have one or more first wave energy generator(s) 18, but at least some embodiments may have at least one first wave energy generator(s) 18.

Second wave energy generators 30 may have tracks 32 with one or more magnets 34 which are constrained within tracks, such as curved, linear or other track. Illustrated tracks 32 are semicircular, but could be parabolic, curved and/or linear depending upon the particular construction. Coils 36, if utilized, may conduct electrical energy arising from the movement of the magnet(s) relative to the coil 36. Magnets 34 may be ball or cylindrically shaped to be able to roll along track 32 in many embodiments. Second wave energy generators 30 move as the platform 10 pitches with wave action such as approximately about center of buoyancy 37 shown by rotation arc 38 or otherwise. Second wave energy generators 20 also may operate like a “shake light” as describe above, or otherwise. Track 32 may be constructed to conduct electricity, possibly with or without coil 36.

For the illustrated embodiment, the tracks 34 are preferably radially disposed relative to center axis 29 having central wind turbine 44 for at least some embodiments. The tracks 32 are also preferably radially oriented so that when the platform 10 rocks, rolls or pitches with wave action about a center of buoyancy 37 illustrated by rotational arc 38 which would be similar regardless how the platform 10 rocks or pitches, the magnets 34 rotate about tracks 32 the most at the bottom and the top of the pitching/rolling and less so about the pitch axis often the center of buoyancy 37. As the magnet(s) 34 move relative to their respective tracks 32 the coils 34, if utilized, capture electrical energy which may be directed out cable 16 to a remote location for use and/or storage. Some second wave energy generators 30 are believed to be able to operate without coils 34, and instead, have another way to capture electrical energy as the magnet (s) 34 move through their respective track(s) 32. Second wave energy generators 30 may be stacked and disposed adjacently and/or at intervals 360 degrees about the center axis 29.

All embodiments may not have second wave energy generator(s) 30, but many may utilize at least one, if not a plurality of second wave energy generator(s) 30. Some embodiments may have second wave energy generators stacked relative to one another, such as above one another, or other configuration of elevational difference in addition possibly having lateral spacing apart from one another whether parallel to one another, radially oriented relative to a common center, or otherwise. Second wave energy generators 30 may act, at least in part, to stabilize a waterborne energy platform 10 to reduce the magnitude of the pitch or roll of the waterborne energy platform 10, such as along arc 38 illustrated or otherwise.

Third wave energy generator(s) 40 may be located in ball 42 which may rotate to support a central wind turbine 44 in a vertical orientation, possibly employing software and/or bearing ring 54. Ball 42 may have inner 46 and outer 48 surfaces to which magnet(s) 50 may move relative there, preferably relative to coils 52, if utilized, which may convert the movement of magnetic field relative to the coil 52 into electrical energy. Some embodiments may not require coils 52. Software may assist in keeping central wind turbine 44 vertical using driven bearings 58 which are preferably disposed to contact outer surfaces 48 for at least some embodiments and are located along side to side axis 59 as well as front to back axis 61 (perpendicular thereto into and out of the page). Third wave energy generator(s) 40 may also work like a “shake light,” or otherwise. Coils 52 may extend radially away from a bottom 53 like spokes from a central hub and may restrict the travel of magnet(s) 50 to specific paths, for at least some embodiments. The ball 42 has an outer diameter of about 30 feet in the illustrated embodiment and the magnet 50 is ball shaped with a diameter of about six feet in the preferred embodiment.

All embodiments may not have a third wave energy generator(s) 40, even if they employ large wind turbines which are maintained vertically, in spite of roll of the float 20. Third wave energy generator(s) 40 may act, at least in part, to stabilize a waterborne energy platform 10 to reduce the magnitude of the pitch or roll of the waterborne energy platform 10, such as along arc 38 illustrated or otherwise.

It has been discovered that using at least some combination of multiple types of wave energy generators 18,30,40 may provide electricity to remote locations such as through cable 16, or other mechanisms.

Figure 3:
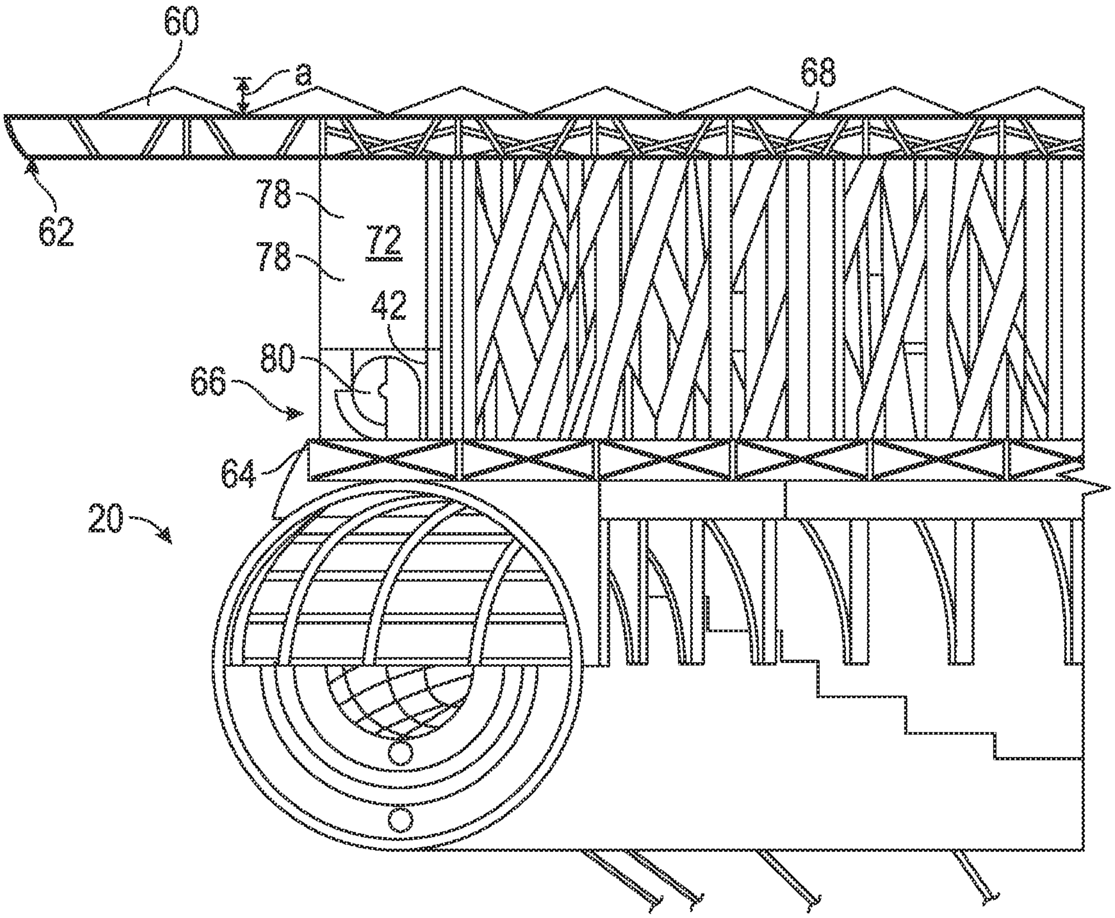
FIG. 3 is a cutaway plan view of a portion of the waterborne energy generation system of FIG. 1.

As seen in FIG. 3, solar panels 60 may be provided on upper platform 62. Platform 62 preferably extends cantileveredly relative to float 20, both internally and externally whereby with the angles α of the solar panels 60 being at about 10 up to 30 degrees relative to a plane through platform 62 provide up to about twice, or more, the amount of surface area of solar panels 60 as could be contained flatly on a similar platform not extending beyond an outer perimeter of the float 20. Solar panels 60 need not be utilized with all embodiments, but may be combined with any or all of the various types of wave energy generators 18,30,40. Solar panels may also direct electricity through cable 16 or other mechanism to a remote location.

Float 20 is preferably toroidal in shape like a toroid, ring or life preserver having a substantially constant cross section for many embodiments. For some embodiments it may have a diameter d of 30 feet or other distance. Float 20 may have an outer diameter of about 150 feet and the platform 62 may have an outer diameter of about 180 feet in the illustrated embodiment. Other embodiments may have other dimensions. Frame 64 may be supported by float 20 to then support a plurality of first and second wind generators 66,68 as will be explained in further detail below.

Figure 4:
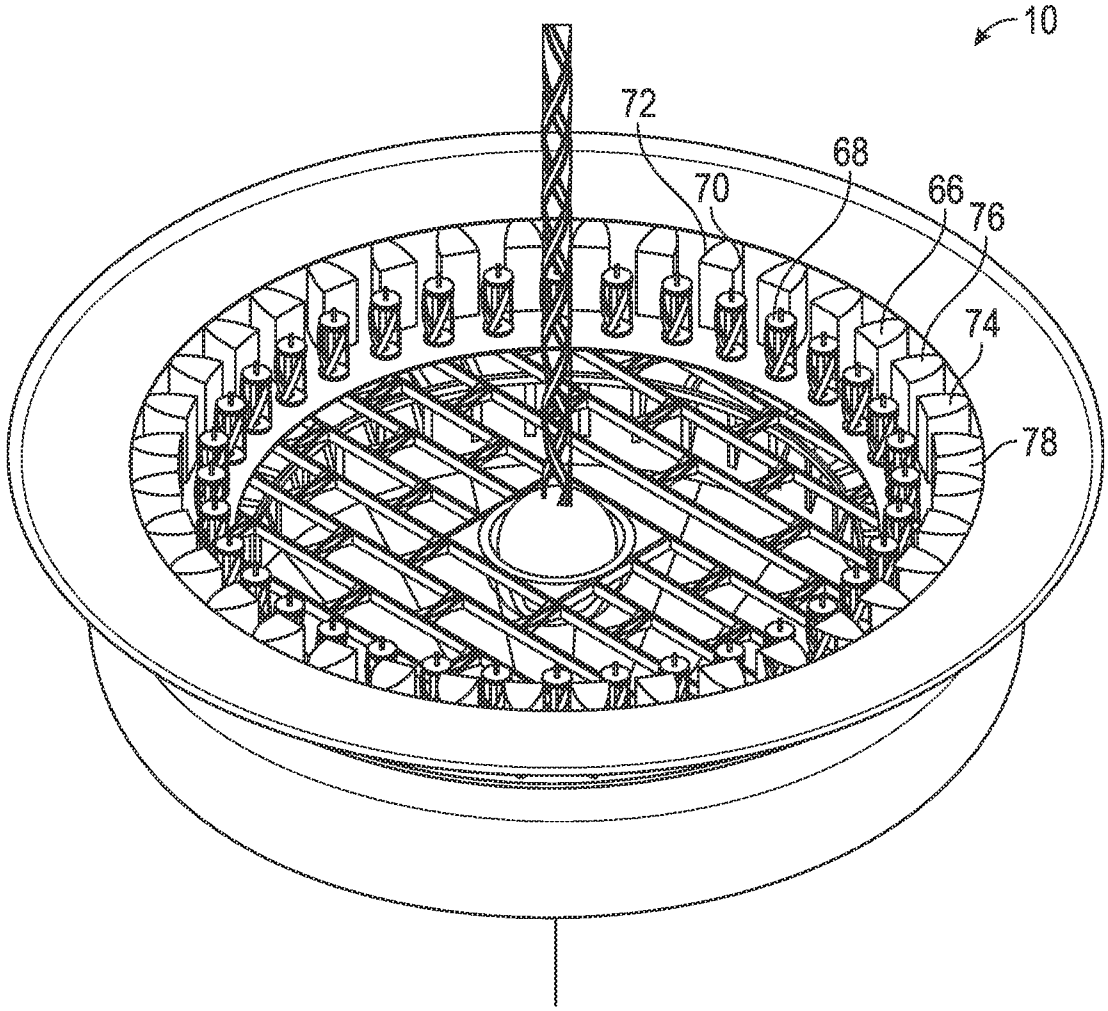
FIG. 4 is a cutaway perspective view of the waterborne energy generation system of FIG. 1 with the platform and solar panels removed.

FIG. 4 shows a cutaway view of the platform 10 with the solar panel platform 62 and solar panels 60 removed. Second wind generator 66 has directing surfaces 70,72 which cooperate with adjacent first wind generator 74 to provide gaps 76 therebetween. Orifices along the surfaces 70,72 are believed to provide a venturi effect to pull air through generator 80 with air pulled from inlet 82. The illustrated embodiment has thirty six first wind generators 66. Other embodiments may have other numbers of second wind generators 66, if used. Some embodiments may not have generators 80 in the second wind generators 66, but instead focus air flow onto first wind generators 68 which may be vertically oriented generators. Central wind turbine 44 may be a rather large vertically oriented turbine for at least some embodiments. In the illustrated embodiment central wind turbine 44 is one hundred twenty feet and provides power through cable 16 to remote locations along with first and second wind generators 66,68, or some combination thereof. Of course a single or multiple units and/or styles of any of central wind turbine 44, or first and second wind generators 66,68 may be utilized singularly on a float 20 to generate electricity, or may be used in combination with any or all of the wave energy generator(s) 18,30,40 and/or the solar panels 60. Combinations of the various electrical generators are believed to provide large quantifies of electrical energy in a sustainable and cost efficient manner using at least some of the systems provided herein and may be used by the float 20 for various purposes and/or delivered remotely via cable 16 or otherwise, such as to a land based station for distribution therefrom or otherwise.

Figure 5:
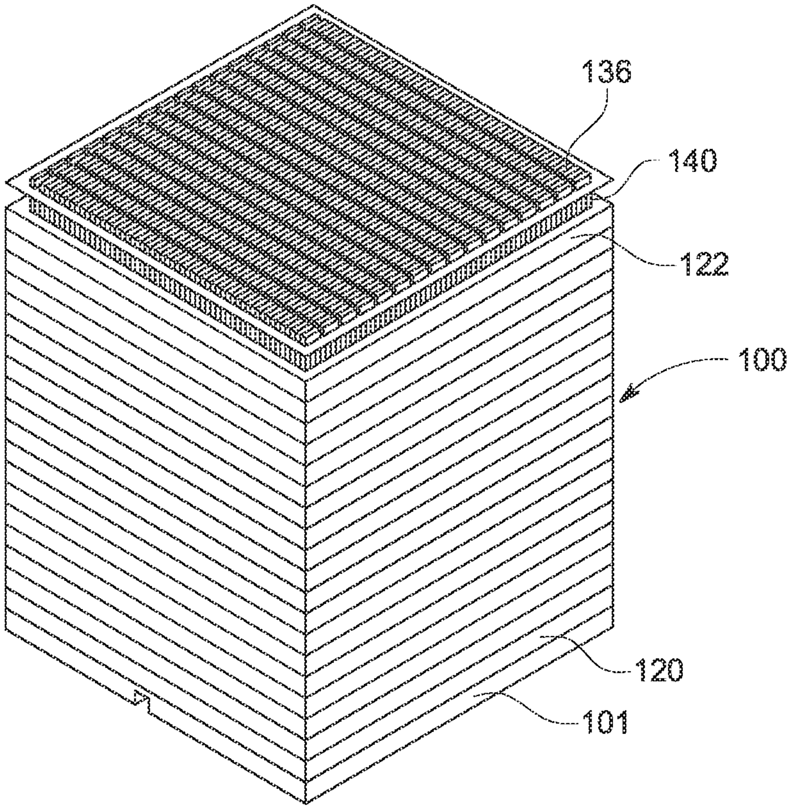
FIG. 5 is a perspective view of a second alternative embodiment of the present invention as an agricultural facility using technology similar to the embodiment of FIGS. 1-5.
Figure 6:
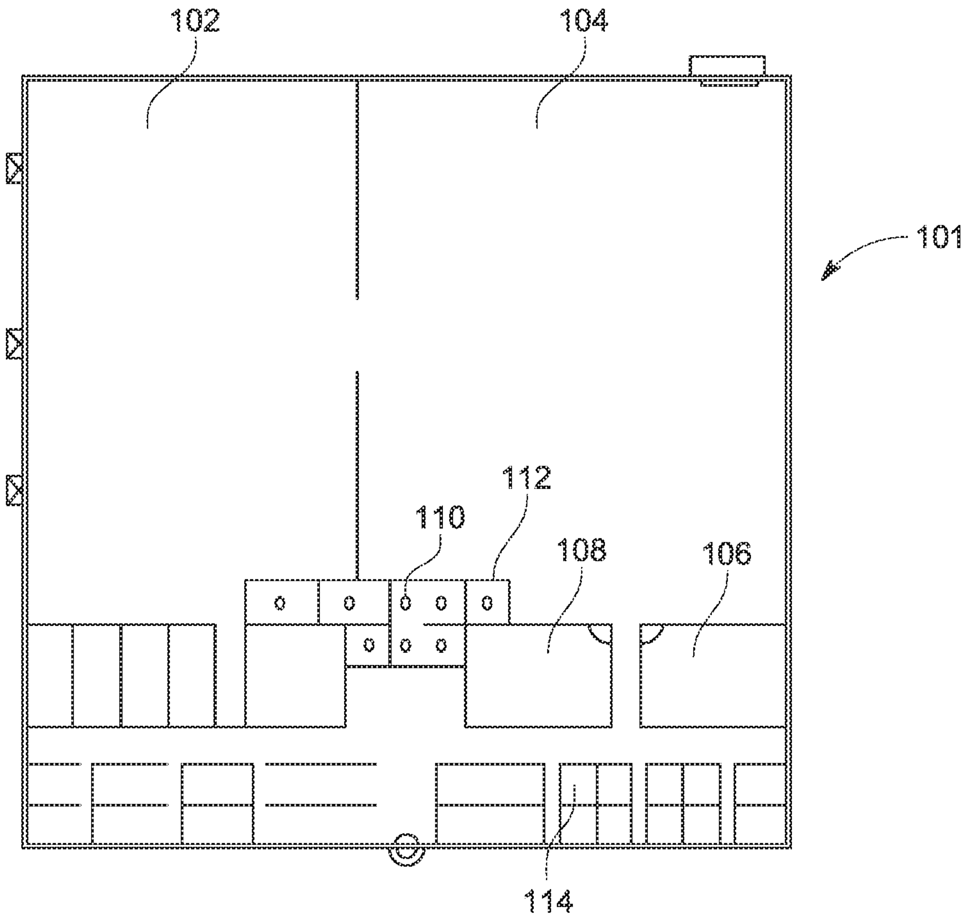
FIG. 6 is a top plan view of a first floor of the agricultural facility embodiment of FIG. 5.

FIG. 5 shows a first alternative embodiment in the form of an agricultural facility 100. As shown in FIG. 6, the facility may have a first floor 101 calculated to provide a retail space 102, such as a farmer's market or other retail. Warehouse 104 may also be provided as well as refrigerator space 106 and/or freezer space 108. Elevators 110, bathrooms 112 and offices 114 may also be provided. At least some of these rooms may also be provided on other floors, but for many embodiments, grow floors 120 will not normally be occupied by people as will be described below.

Figure 7:
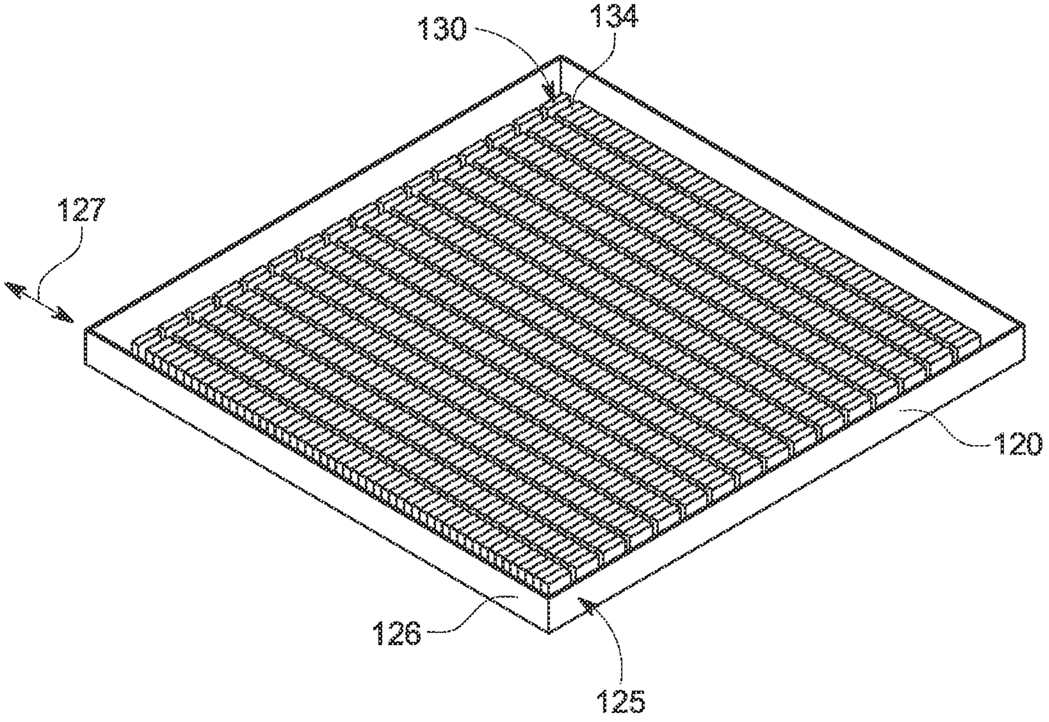
FIG. 7 is a perspective view of a grow floor of the agricultural facility embodiment of FIG. 5.

FIG. 7 shows a grow floor 120, one of eighteen shown in FIG. 5. Grow floor 120 preferably receives carbon dioxide from carbon capture units 124 on an upper floor 122, which could be a roof, if not remotely located. Carbon dioxide is known to increase yield up to 20% for at least some plant varieties. FIG. 7 also shows a compact grow arrangement of adjacent stacks 126 which are shown in greater detail in FIG. 8. Adjacent stacks 126 may be provided in rows 128, preferably adjacent rows, possibly with a single gap 130 in each row 128 to permit inspection, picking, planting, etc., possibly at least partially robotically assisted. Stacks 126 may be moved in direction 127 so that gap 130 moves in direction 127 where necessary to accommodate tasks for specific ones of the stacks 128. Of course, if people are permitted in the grow floor 120, they will either require self-contained breathing devices or ventilation sufficient to provide normal oxygen levels on the grow floor 120. Instead of having gaps 130 between every stack 126 like exists in rows of farmland, the yield may be almost doubled with this type arrangement since there are not gaps adjacently disposed to every stack 126.

Figure 8:
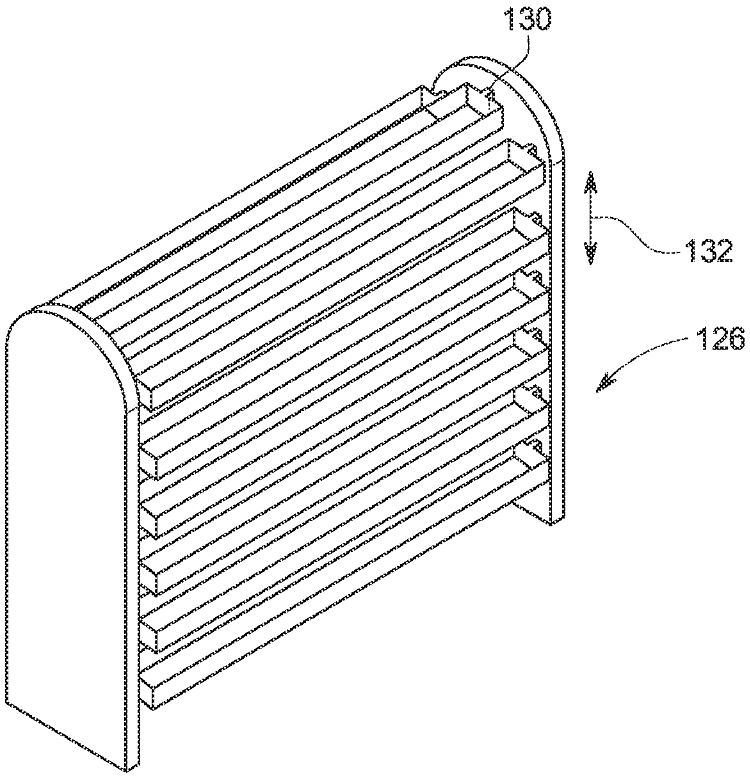
FIG. 8 is a perspective view of a preferred stack as used in the embodiment of FIG. 5.
Figure 9:
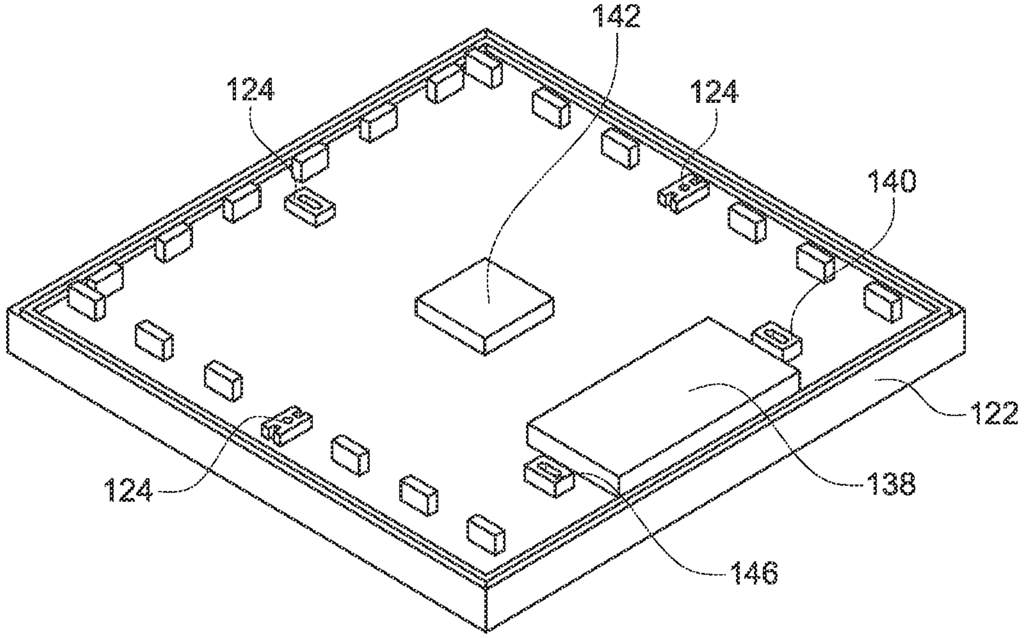
FIG. 9 is a perspective view of a top floor of the embodiment of FIG. 5.

Stacks 126 also permit an increase in yield as seen in FIG. 8. Stacks 126 may have up to ten or more levels per grow floor 120 so as to increase yield by a factor of 10, etc. By using LED lighting with little heat generated compared to other light sources, a need for spacing between adjacent stacks 126 is limited in a desirable manner. Gap 130 may only be needed to accommodate planting, picking and any inspection/maintenance, but not for airflow, for many embodiments. Variable spectrum lighting as is known in the art may also be utilized with lighting to increase yield up to another 10%. Hydroponic growing techniques may also be utilized to increase yield up to another 20%.

Stacks 126 may rotate levels 130 vertically 132 for planting, picking, inspection, lighting exposure, etc. Robots 134 may assist in planting, picking, fertilizing, etc. for more sophisticated embodiments. Water may be collected on the roof or from solar panels 136 and directed to water storage 138. Automated watering systems, possibly using robots 134, software, and/or other systems could assist in providing water to growing plants. Dehumidifiers 140 may also generate water to provide to water storage 138. HVAC unit(s) 142 may maintain temperature within the facility 100 at various levels. Dehumidifiers 140 may be directed to remove air externally relative to facility 100 as well as internally, such as from particular or all of the grow floors 120.

Figure 11:
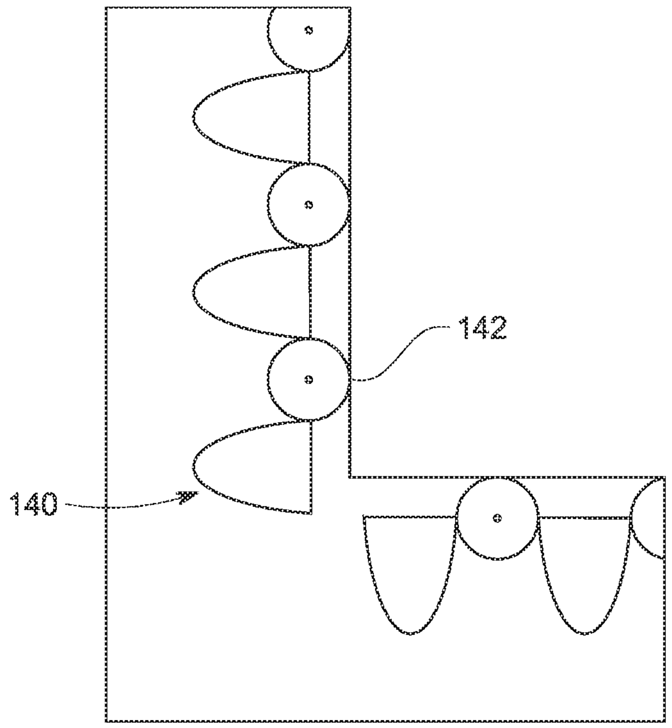
FIG. 11 is a top plan view of a portion of the agricultural facility shown in FIGS. 5-9.

Solar panels 136 can generate power for the facility 100 and/or surrounding area electrical needs. First and second wind generators 140, 142 shown in FIG. 11 may be similar or dissimilar to the first and second wind generators shown with the waterborne energy system 10. Solar panels 136 may overhang exterior walls 141 of facility 100 so as to provide shade, staying within the property lines of the facility 100 and meeting building codes for some embodiments.

Figure 10:
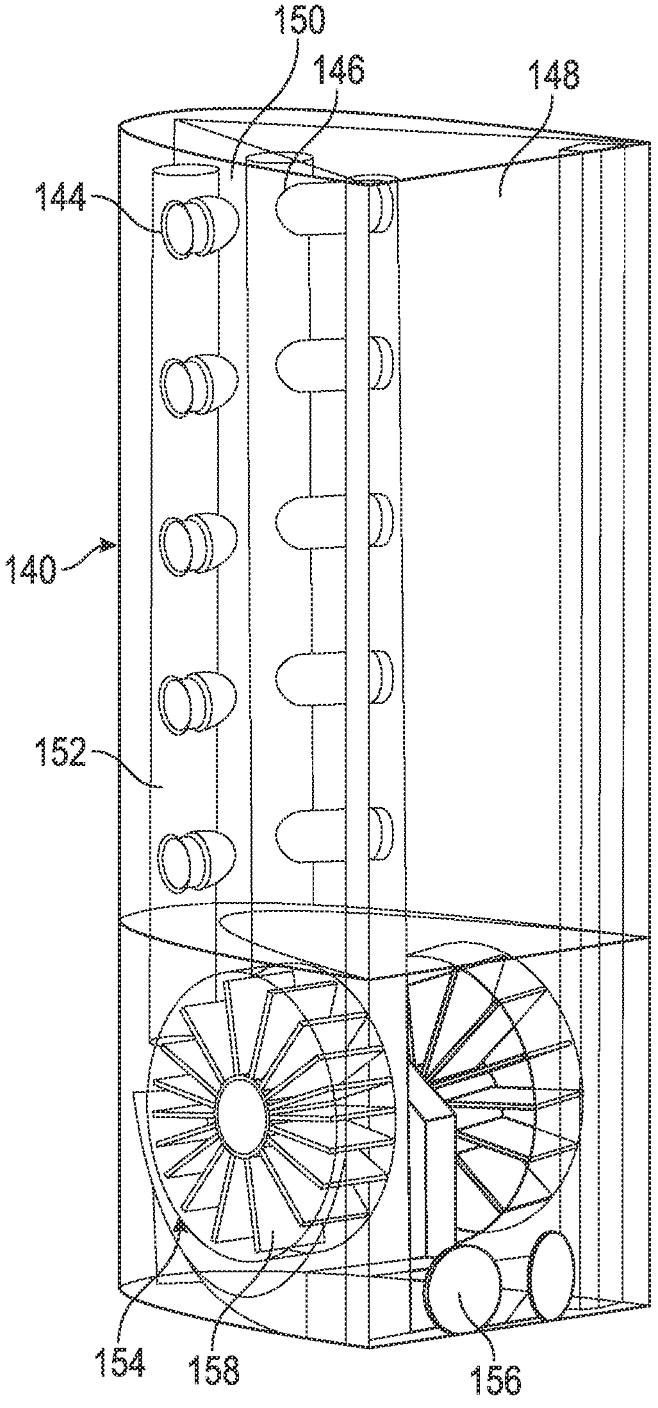
FIG. 10 is a perspective view of an air director/turbine as shown in FIGS. 1-5.

FIG. 10 shows a perspective view of the first wind generator 140 (same construction as provided above for the second wind generator 66 of the waterborne energy platform 10) with internal portions shown in phantom which is similar in construction to the second wind generators 66 of the waterborne energy system 10. Orifices 144 on directing surfaces have faster air than at rear 148 of director surface 146 to create a lower pressure and pull air from outlet tube 152 connected to generator 154 or flywheel having inlet 156 at rear 148. As air is pulled from inlet 156 in contacts blades 158 to make them rotate to generate electricity. Air preferably is moved by the venturi effect and if constructed as shown, upwardly from inlet 156 and out orifices 144. Each side of first wind generator 140 may have its own generator 154. Other designs may be slightly or significantly different.

Some embodiments may not necessarily generate their own power, but rely on traditional off location power sources. Other embodiments may rely on well water or other water sources, at least partially, if not entirely. Still other embodiments may not hydroponically grow plants, or may have less sophisticated stacks 126, if any stacks 126 at all, less dense arrangements on grow floors 120, not utilize variable spectrum or even LED lighting, or not provide carbon dioxide to plants, or even capture carbon dioxide. A combination of these features has been found to dramatically increase yield. Excess carbon dioxide, if captured and not used, could be sold in the marketplace to carbonate beverages or other food/industrial processes.

Figure 12:
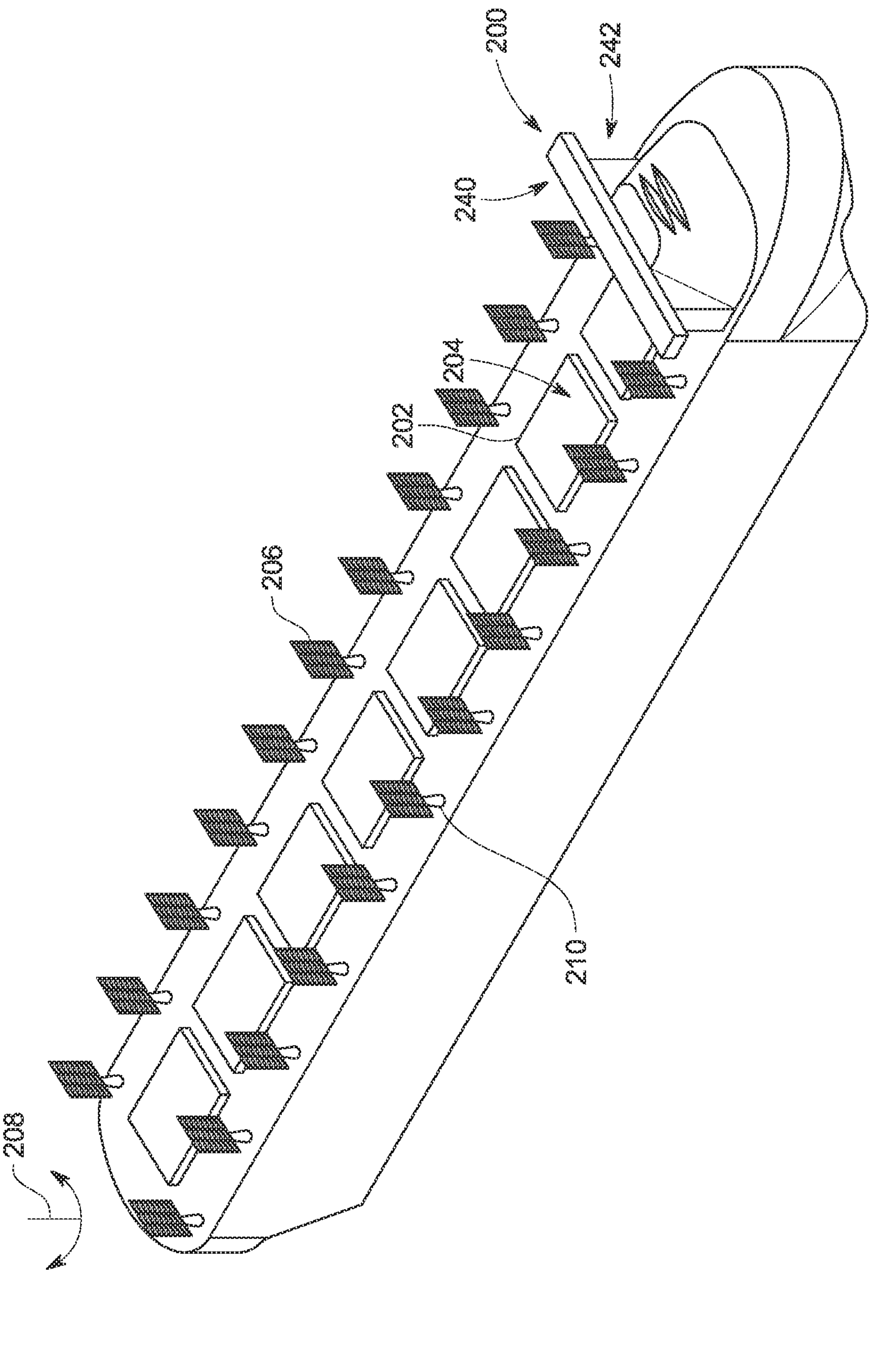
FIG. 12 is a top perspective view of an alternative ship embodiment using similar technology as some of the other embodiments.
Figure 13:
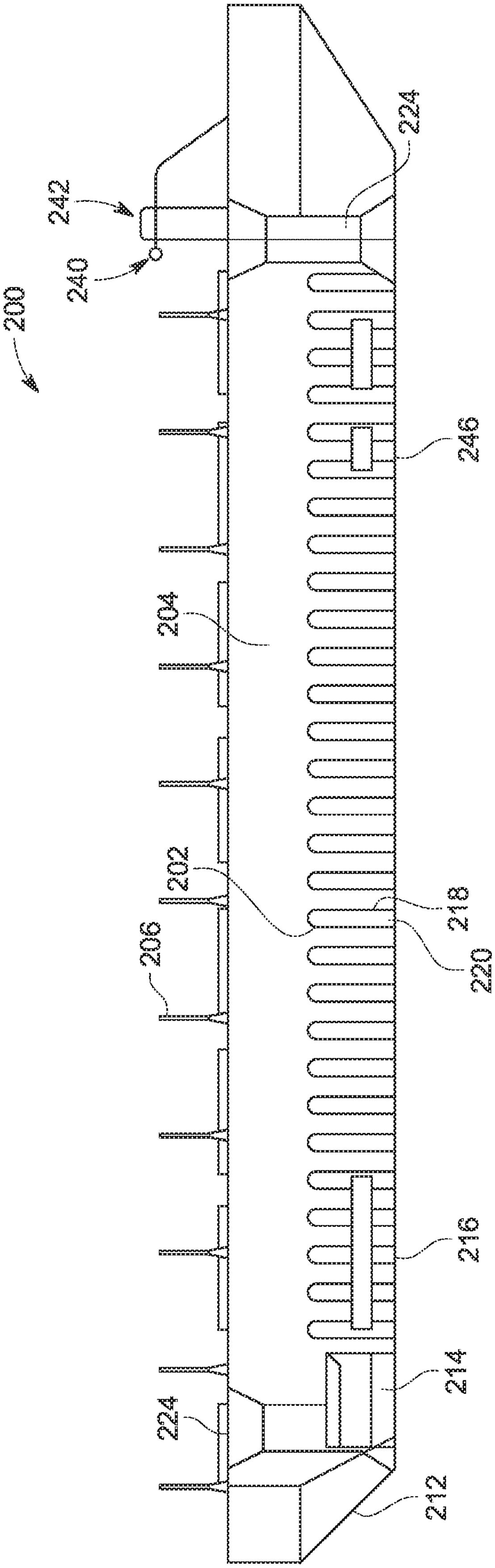
FIG. 13 is a side plan cutaway view of the ship of FIG. 12.
Figure 14:
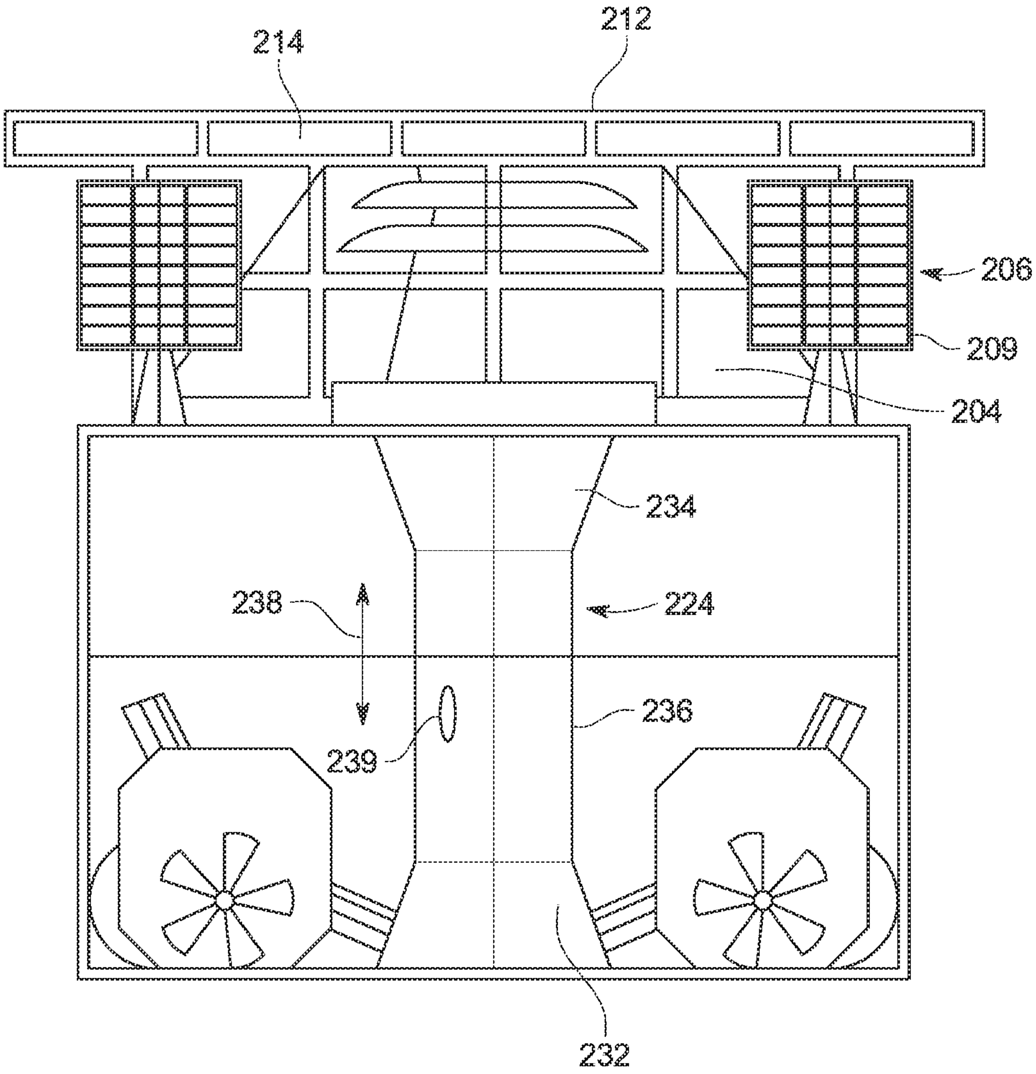
FIG. 14 is a rear plan view of the embodiment of FIG. 13.

FIG. 12 shows a first alternatively preferred embodiment in the form of a ship 200. Ship may have first solar panels 202 which may slide relative to one another to permit access into hold 204 of ship 200 or cargo transportation, if utilized. First solar panels 202 may be a first source of energy. Sails 206 may rotate about respective axes 208 when in a deployed configuration. Sail 210 is a stored configuration such as if the wind direction is not favorable or other situation. Sails may be composed of second solar panels 209. Solar panels 209/sails 206 may be retracted when onloading/offloading cargo or for other purpose. Sails 206 may be utilized strictly for generating solar energy in some embodiments, or may provide at least some propulsion in other embodiments. Sails 206 with or without second solar panels 209 may be provided, or not, in various embodiments. Second solar panels 209 may be a second source of electrical energy.

Propeller(s) 212 may be driven by motor(s) 214 which could be electrical, petroleum driven and/or hybrid. Fuel storage 216 is shown, if utilized. Roll energy capture device 218 are shown which have magnet(s) 220 and tracks 222 similar to first wave energy generators 30 shown for the waterborne energy capture system 10 described above, but could be differently constructed in other embodiments. Roll energy capture device 218 may also assist in stabilizing roll of the ship 200. Roll energy capture 218 device may also provide electrical energy for the ship 200 and/or propulsion assist.

Pitch energy generators 224 may be advantageously located near bow 226 and/or stem 228 to take advantage of pitch of the ship 200, if utilized. Pistons 230 are preferably magnets which are repelled by stationary magnets 232,234 at opposite ends of tracks 236. As the pitch energy generators 224 are moved up or down along vertical axis 238, the pistons 230 oscillate, or move up or down concurrently with or, more likely, oppositely to the pitch direction to thereby generate electricity. Additionally, the movement of the pistons 230 is believed to assist in stabilizing the ship 200 to reduce overall pitch of the ship 200 as would otherwise be experienced. Other designs may have other constructions of pitch energy generators and/or roll energy generators 218, 224 to assist in providing electrical energy for the ship 200, possibly to supplement propulsion needs.

The rear 240 of tower 242 may have solar panels 244 to generate electrical energy for use by the ship 200 possibly including propulsion. Electrical energy from solar panels 209 and panels 202 may also provide electrical energy for the ship 200. Excess energy may be stored in batteries 246.

Figure 15:
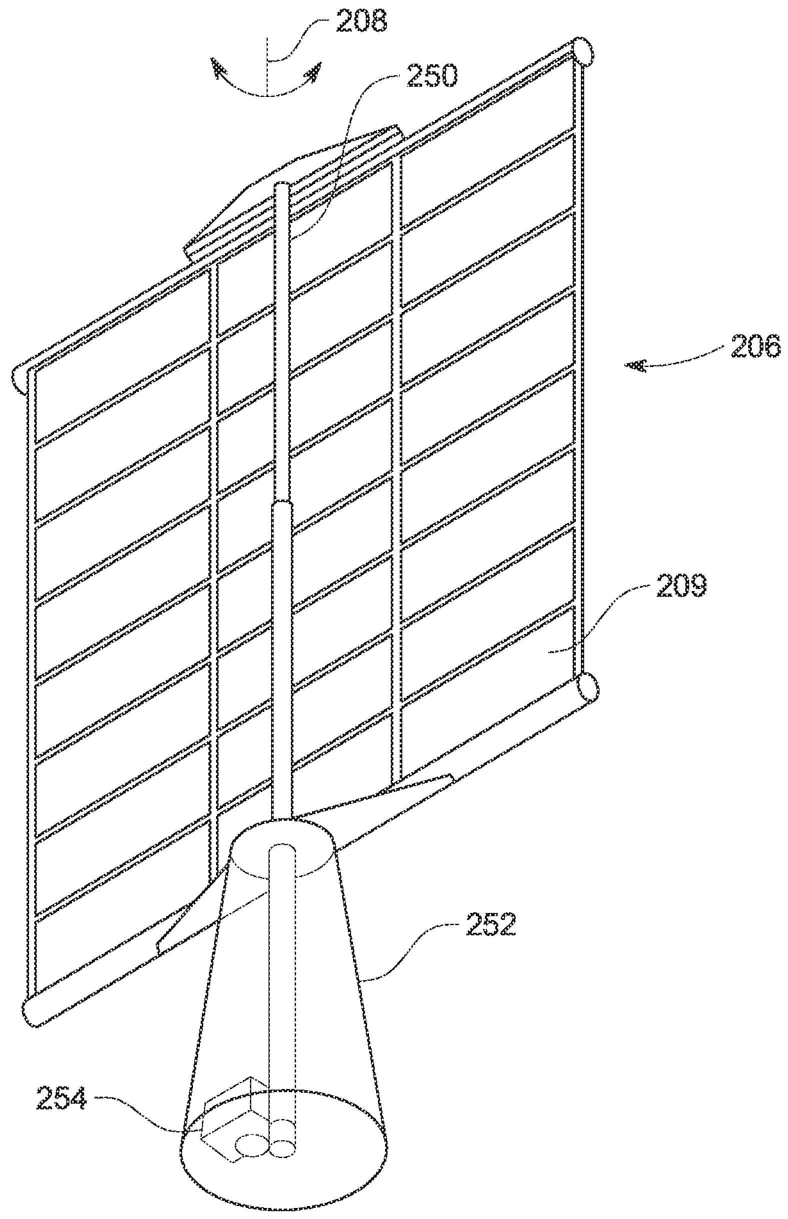
FIG. 15 is a perspective view of a sail shown in FIGS. 12-14.

FIG. 15 shows a sail 206 in a deployed configuration with internals in phantom with telescoping mast 250 which can retract into base 252 while gathering solar panels 209 in storage tube 254. Motor 254 may rotate the mast 250 to either provide a sail and/or to assist in directing solar panels 209 towards the sun as desired. Other embodiments may have these and/or other features.

Some ship 200 embodiments may have at least some if not all of solar panels 202, 209,244. Some ship embodiments may have pitch energy generators 224 and/or roll energy generators 218. Various combinations of these electrical generators are believed to provide a beneficial ship 200 which uses less fossil fuels than prior art vessels. Any ship type is believed to benefit from the technology disclosed herein, whether manned or unmanned.

Various embodiments benefit from the technology provided herein. Electrical power may be regenerative, instantaneous and/or passively generated in a sustainable and environmentally friendly manner.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

Having thus set forth the nature of the invention, what is claimed herein is:

1. A waterborne energy capture device comprising:
- a track supported buoyantly by water;
- a magnet constrained to move along the track along a path of the track;
- an inductor connected to the track converting motion of the magnet along the track into electrical energy;
- a float, said float supporting a plurality of energy capture devices;
- radially disposed vertical wind turbines above the float;
- directors radially disposed externally to the vertical wind turbines focusing air flow towards the vertical wind turbines; and
- a platform above at least one of the directors and the vertical wind turbines, said platform supporting solar panels thereon;
- wherein the wave motion of the water imparts motion to the track thereby moving the track relative to the magnet generating electrical energy.

2. The waterborne energy capture device of claim 1 wherein the solar panels are angled at least 10 degrees relative to the platform.

3. The waterborne energy capture device of claim 2 wherein the platform extends cantileveredly beyond a radial perimeter of the float and at least some solar panels extend radially beyond the perimeter of the float.

4. The waterborne energy capture device of claim 1 wherein the float supports a plurality of energy capture devices.

5. The waterborne energy capture device of claim 4 wherein at least some of the plurality of energy capture devices are first wave energy capture devices and are radially oriented about the float.

6. The waterborne energy capture device of claim 5 wherein at least some of the first wave energy capture devices are stacked vertically along the float.

7. The waterborne energy capture device of claim 1 wherein the float has a round radial circumference.

8. The waterborne energy capture device of claim 7 wherein the float has a circular cross section and the track is located within the cross section.

9. The waterborne energy capture device of claim 8 further comprising a deck on the float, said deck supporting at least one of the solar panels and at least one wind turbine.

10. The waterborne energy capture device of claim 9 further comprising a central wind turbine supported by a bearing ring which maintains the central wind turbine in a vertical position.

11. The waterborne energy capture device of claim 1 further comprising directors radially disposed externally to the vertical wind turbines focusing air flow towards the vertical wind turbines.

12. The waterborne energy capture device of claim 11 wherein the directors have openings on side surfaces which pull air from within the directors through a wind turbine generator having an inlet on a radially inward side of the directors.

13. A waterborne energy capture device comprising:

a track supported buoyantly by water;

a magnet constrained to move along the track along a path of the track;

an inductor connected to the track converting motion of the magnet along the track into electrical energy;

a float, said float supporting a plurality of energy capture devices;

a deck on the float, said deck supporting at least one of the solar panels and at least one wind turbine;

a central wind turbine supported by a bearing ring which maintains the central wind turbine in a vertical position; and a wave energy generator disposed within a ball supporting the central wind turbine, said ball supported by the bearing ring.

14. The waterborne energy capture device of claim 13 wherein the wave energy generator has a magnet disposed between inner and outer shells of the ball.

* * * * *